United States Patent

Nelson et al.

[11] Patent Number: 5,814,975
[45] Date of Patent: Sep. 29, 1998

[54] INVERTER CONTROLLED SERIES COMPENSATOR

[75] Inventors: Robert J. Nelson, Orlando; Donald G. Ramey, Maitland, both of Fla.

[73] Assignee: Westinghouse Electric Corporation, Pittsburgh, Pa.

[21] Appl. No.: 471,805

[22] Filed: Jun. 5, 1995

[51] Int. Cl.[6] .................................................. G05F 1/70
[52] U.S. Cl. .............................................. 323/207; 363/40
[58] Field of Search ....................... 323/205, 207, 323/208; 363/35, 36, 39, 40; 307/105

[56] References Cited

U.S. PATENT DOCUMENTS

| | | | |
|---|---|---|---|
| 4,292,545 | 9/1981 | Hingorani et al. | 307/102 |
| 5,051,683 | 9/1991 | Hirose et al. | 323/207 |
| 5,166,597 | 11/1992 | Larsen et al. | 323/215 |
| 5,198,746 | 3/1993 | Gyugyi et al. | 323/207 |
| 5,329,222 | 7/1994 | Gyugyi et al. | 323/207 |
| 5,343,139 | 8/1994 | Gyugyi et al. | 323/207 |
| 5,355,295 | 10/1994 | Brennen | 363/40 |
| 5,371,664 | 12/1994 | Seki | 363/51 |
| 5,384,528 | 1/1995 | Leowald et al. | 323/209 |
| 5,404,092 | 4/1995 | Gegner | 323/207 |

FOREIGN PATENT DOCUMENTS

| | | |
|---|---|---|
| 0571645 | 12/1993 | European Pat. Off. . |
| 8704538 | 7/1987 | WIPO . |

*Primary Examiner*—Matthew V. Nguyen

[57] ABSTRACT

An Inverter-Controller Series Compensator (ICSC) has a reactive impedance element connected in series with the line of an ac transmission system and an inverter connected in parallel with the reactive impedance element to control the voltage across, and therefore the current through, the reactive impedance element to provide a continuously adjustable series reactance for power flow control, series voltage regulation, oscillation damping and stability enhancement, as needed. By providing the inverter with a source/sink of real power, the ICSC is further capable of adjusting series impedance. The reactive impedance element can be either a capacitive element or an inductive element depending upon whether there is a need for capacitive or inductive compensation.

13 Claims, 2 Drawing Sheets

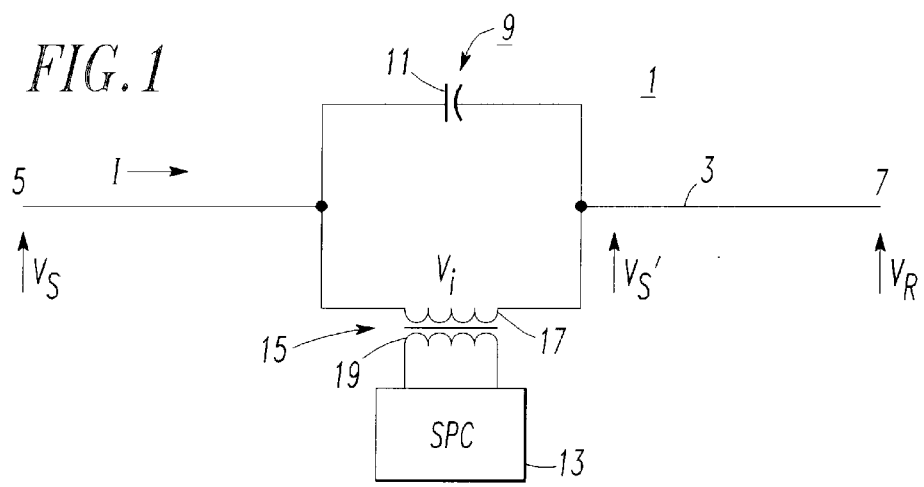
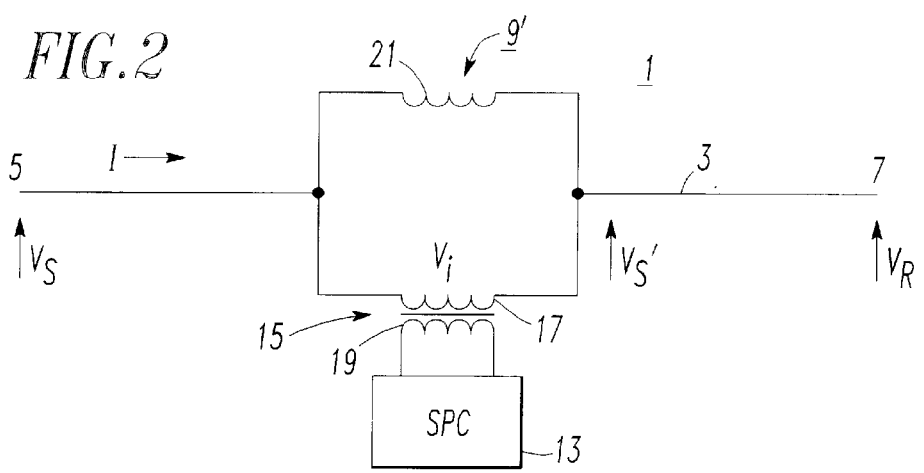
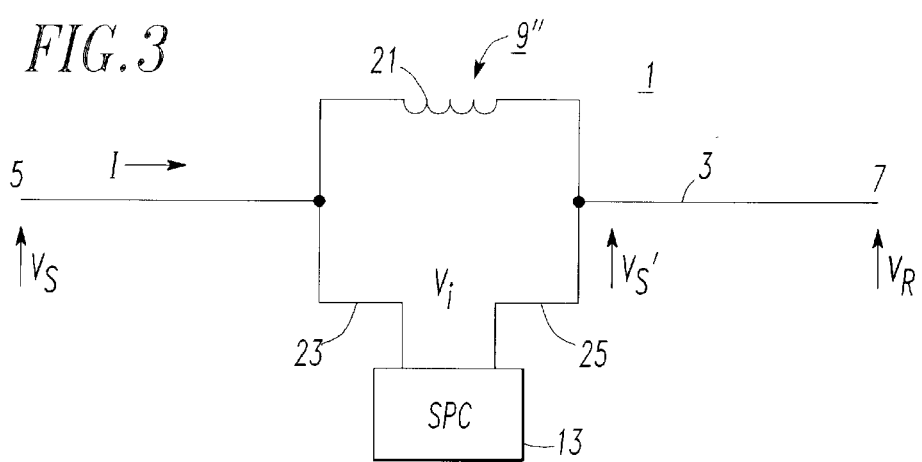

# INVERTER CONTROLLED SERIES COMPENSATOR

BACKGROUND OF THE INVENTION

1. Field of the Invention

This invention relates to apparatus for providing compensation in electric power transmission lines for power flow control and damping of oscillations. More particularly, it relates to such apparatus having a reactive impedance connected in series with a transmission line and a switching power converter connected in parallel with the reactive impedance to control the voltage across, and therefore the current through, the series connected reactive impedance.

2. Background of Information

The present state of the art in series line compensation for ac transmission lines is pure reactive control using thyristor-controlled series compensation (TCSC), which utilizes series capacitors in parallel with thyristor switches or, for inductive compensation, thyristor-controlled reactors. One difficulty with the TCSC is that they are susceptible to subsynchronous resonant currents. In addition, the TCSC must have sufficient MVA rating to accommodate the current carried by the transmission line during normal and abnormal conditions.

Recently, the concept of using a three-phase inverter to insert a voltage into a transmission line via a series transformer to facilitate transmission of power has been proposed. The inverter, employing Gate Turn-Off (GTO) thyristors, is capable of either supplying vars to the transmission line or absorbing vars from the transmission line as a free standing device. Such a device is called a solid state series compensator (SSSC). Such a controller is disclosed in U.S. Pat. No. 5,198,746.

The SSSC injects a voltage in quadrature with the line current. Thus, the SSSC can only provide reactive compensation. It has no capability to absorb or generate real power.

Another recently developed device is the Unified Power Flow Controller (UPFC) which adds to the SPFC the capability of exchanging real power with the transmission line in addition to reactive power. Such a device is described in U.S. Pat. No. 5,343,139. This device has the capability of controlling the phase angle of a voltage injected in series with the transmission line throughout a full 360 electrical degrees with respect to the line current and therefore can independently control reactive power flow, transmission line impedance, transmission line voltage magnitude, and transmission line voltage phase angle. The real power can be drawn from an independent source or from the transmission line such as by an ac to dc converter connected to the transmission line by the shunt transformer and connected to the inverter through a dc link.

The UPFC provides a great deal of flexibility in power flow control; however, the shunt ac to dc converter adds significantly to the cost and complexity of the apparatus. Furthermore, in some applications, complete flexibility of flow control is not needed. Commonly owned U.S. patent application Ser. No. 08/368,947, filed on Jan. 5, 1995, now U.S. Pat. No. 5,469,044, suggests that for applications in which the control requirements are asymmetrical, the MVA ratings of the series inverter of the UPFC can be reduced by vectorially adding a bias voltage to the voltage generated by the series inverter. Commonly owned U.S. patent application Ser. No. 08/366,646, filed on Dec. 30, 1994, discloses a series-connected inverter which can supply both positive and negative real power in addition to reactive power compensation to control oscillations on a transmission line. The real power requirements are provided by devices which are independent of the transmission line. Both positive and negative real power can be provided by an energy storage device such as a battery or a superconducting magnet. Where less dynamic compensation is required to control oscillations, only positive real impedance in the form of a resistive impedance can be used to absorb real power from the transmission line during real power surges.

In these inverter based compensation devices, failure of the inverter results in complete loss of series compensation. There is a need for an improved device for providing series compensation in an ac transmission line which provides a substantial portion of the flexibility of these inverter based series compensation devices, but which is less expensive, and does not result in the loss of all series compensation if the inverter is a out of service.

There is further need for such a device which, where needed, can supply real power compensation in addition to reactive power compensation.

SUMMARY OF THE INVENTION

These needs and others are satisfied by the invention which is directed to an inverter-controlled series compensator (ICSC) having a reactive element, either an inductor or capacitor, connected in series with a transmission line and a continuously adjustable inverter in parallel with the reactive element to control the voltage across the reactive element, and, therefore the current flow in order to provide a continuously adjustable series reactance for power flow control, series voltage regulation, oscillation damping, and stability enhancement, as appropriate. The switching power converter may be interfaced with the power system by a series transformer or directly, and may be single phase, three phase or N-phase, as power system requirements dictate. The switching power converter may be an inverter having a source or sink of real power or it may be an inverter operated by itself. If the inverter can interface real power, either with the system such as via a shunt connected ac to dc converter or rectifier, or with an independent source or sink, the ICSC is capable of series impedance control; otherwise it is only capable of series reactance control.

More particularly, the invention is directed to apparatus for providing series compensation in an ac electrical power transmission system having a transmission line carrying an ac current at a selected transmission line voltage and fundamental frequency, said apparatus comprising:

a reactive impedance element connected in series in said ac transmission line;

switching power converter means generating an alternating voltage at said fundamental frequency with controllable magnitude and controllable phase angle;

means connecting said switching power converter means in parallel with said reactive impedance element to impress said alternating voltage across said reactive impedance element and thereby control flow of said current through said transmission line; and control means controlling said controllable magnitude and said controllable phase angle of said alternating voltage to control said current.

BRIEF DESCRIPTION OF THE DRAWINGS

A full understanding of the invention can be gained from the following description of the preferred embodiments when read in conjunction with the accompanying drawings in which:

FIG. 1 is a schematic diagram of an inverter-controlled series compensator in accordance with one embodiment of the invention.

FIG. 2 is a schematic diagram of a second embodiment of an inverter-controlled series compensator in accordance with the invention.

FIG. 3 is a schematic circuit diagram of an inverter-controlled series compensator in accordance with a third embodiment of the invention.

DESCRIPTION OF THE PREFERRED EMBODIMENTS

Figure 4:
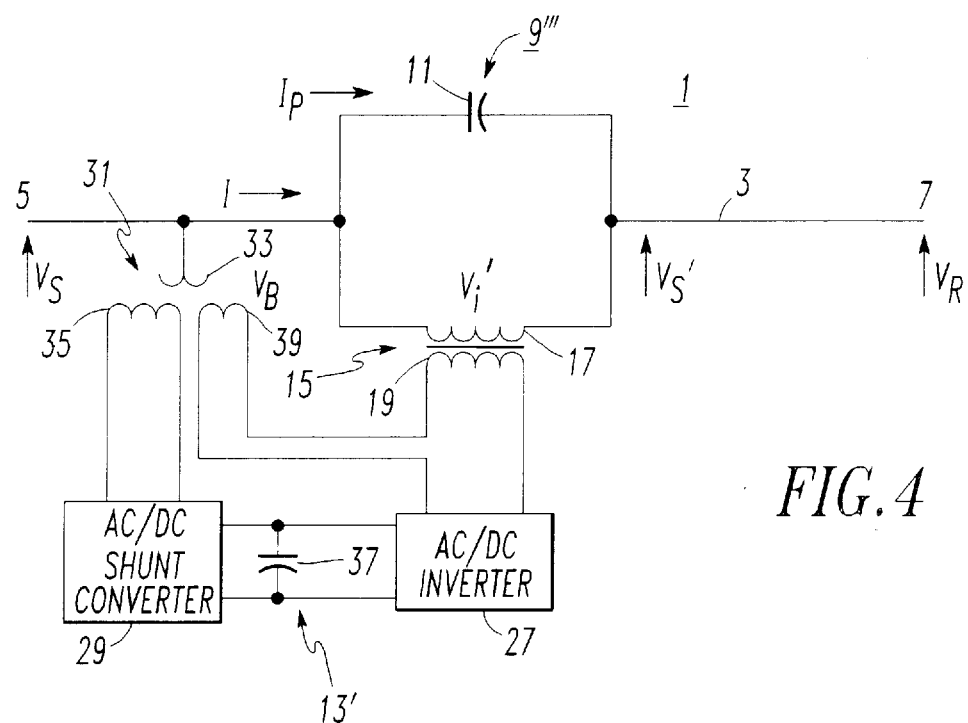
FIG. 4 is a schematic circuit diagram of yet another embodiment of the invention.

FIG. 1 illustrates an ac power transmission system 1 having a transmission line 3 in which a current I flows between ends 5 and 7. The voltage at the end 5 is $V_s$ and at the end 7 is $V_r$. An inverter-controlled series compensator (ICSC) 9 in accordance with the first embodiment of the invention provides series compensation for the transmission line 3. The ICSC 9 includes a reactive element in the form of a capacitor 11 connected in series with the line 3. A switching power converter 13 generates a voltage $V_i$ having a controllable magnitude and a controllable phase angle with respect to the current I. The voltage $V_i$ is impressed across the capacitor 11 by a transformer 15 having a primary winding 17 connected in parallel with the capacitor 11 and a secondary winding 19 connected to the switching power converter 13. Typically, all of the components of the electrical system 1 shown in FIG. 1 would be three phase; however, they are shown in single line for clarity. The switching power converter 13 is, for instance, preferably a voltage sourced inverter employing Gate Turn-Off (GTO) thyristors such as that which forms part of the UPFC described in U.S. Pat. No. 5,343,139 which is hereby incorporated by reference. The inverter which forms the switching power converter 13 can be a stand alone device in which case the voltage $V_i$ will be in quadrature with the current I and the ICSC 9 can provide only reactive compensation. Alternatively, the inverter of the switching power converter 13 can be provided with a real power source, in which case the voltage $V_i$ can have any phase angle with respect to the current I. The compensation voltage $V_i$ adds to the voltage $V_s$, to produce the resultant voltage $V'_s$.

The impedance of the ICSC 9 shown in FIG. 1 is:

$$Z_{ICSC} = V_i/I$$

Where $V_i$=the series voltage inserted by the inverter

I=the line current flow

It can be seen from the above that control of the voltage $V_i$ across the reactive element 11 controls the current I flowing in the transmission line. Even without a source of real power, the ICSC 9 provides continuously adjustable series reactance for power flow control, series voltage regulation, oscillation damping, and stability enhancement. With the addition of a real power interface, the ICSC 9 is also capable of series impedance control.

FIG. 2 illustrates another embodiment of the invention in which like components are identified with like reference characters. The only difference in this embodiment is that the reactive element of the ICSC 9' is an inductor 21 rather than a capacitor as in the embodiment of FIG. 1. The embodiment of FIG. 2 would be used where primarily inductive reactive compensation is needed while the embodiment of FIG. 1 would be used where the predominant requirement is capacitive reactive compensation. As in the case of the ICSC 9, a switching power converter 13 of the ICSC 9' may comprise a solid state converter with or without a real power source/sink as required.

FIG. 3 illustrates another embodiment of an ICSC 9'' in accordance with the invention in which the switching power converter 13 is connected directly across the reactive element, in this case the inductor 21, by conductors 23 and 25. Of course this arrangement of having the switching power converter 13 connected directly across the reactive element, could also be used with a capacitive reactive element such as the capacitor 11 in FIG. 1 as well as the inductor 21 shown in FIG. 3. Again the switching power converter 13 may comprise a solid state inverter with or without a source/sink of real power.

FIG. 4 illustrates yet another embodiment of the invention in which the switching power converter 13' is explicitly shown to include a solid state inverter 27 provided with a real power source in the form of a shunt ac to dc converter 29. The shunt converter 29 draws real power from the transmission line 3 through a shunt transformer 31 having a primary winding 33 connected to the transmission line 3 and a first secondary winding 35 connected to the shunt converter 29. The dc terminals of the shunt converter 29 are connected to the dc terminals of the inverter through a dc link in the form of a capacitor 37. Alternatively, the inverter 27 could exchange real power with a real power source independent of the transmission line 3 such as for example, a separate ac source or energy storage device such as a battery or superconducting magnet. A resistive load could be used to provide negative real power only.

If the operation of the inverter 27 does not necessitate the inherent symmetry of voltage control afforded by the inverter, a bias voltage can be added to the inverter voltage $V_i$. The bias voltage can be added to the inverter voltage by connecting a source of the bias voltage in series with the inverter and the secondary winding 19 of the injection transformer 15. In the exemplary system, the bias voltage $V_B$ is generated by a second secondary winding 39 on the shunt transformer 31. The injected voltage $V'_i$ then is equal to the sum of the inverter voltage $V_i$ and the bias voltage $V_B$.

The ICSC is essentially a current control device, although it is capable of either real power flow control or reactive power flow control (or both simultaneously if the inverter is capable of negotiating real power) by suitable on-line analysis. Control of current flow in the series line is obtained by varying the inverter voltage, $V_i$, which, in turn, determines the voltage applied to the parallel reactive element and in consequence the current flow through the element.

Considering the embodiment of the invention shown in FIG. 4, but ignoring the bias voltage $V_B$ for simplicity, real power can be exchanged with the transmission line by coordination of the operation of the series inverter 27 and the shunt inverter 29. The current flow through the capacitor, $I_p$, is given by $I_p = V_i X j \omega C$, so that the series inverter voltage determines both the magnitude and phase (i.e., 90° ahead of $V_i$) of the current flow through the capacitor 11. Since the line current I is the sum of the currents through the series inverter 27 and the parallel capacitor 11, the series inverter 27 must supply only the residual current, i.e., $I_i = I - I_p$. If the series inverter 27 is capable of controlling the phase of $I_i$, (i.e., it can absorb or supply real power), then the real and reactive series flows are independently controllable, since the real and reactive powers are given by:

$$P = R_e(V_s I^*)$$

$$Q = I_m(V_s I^*)$$

and the magnitude and phase of I are controllable and observable. If the series inverter 27 has no capability to negotiate real power, then the phase of $I_i$ is restricted to 90° out of phase with the voltage difference $V_s - V'_s (= V_i)$.

Figure 5:
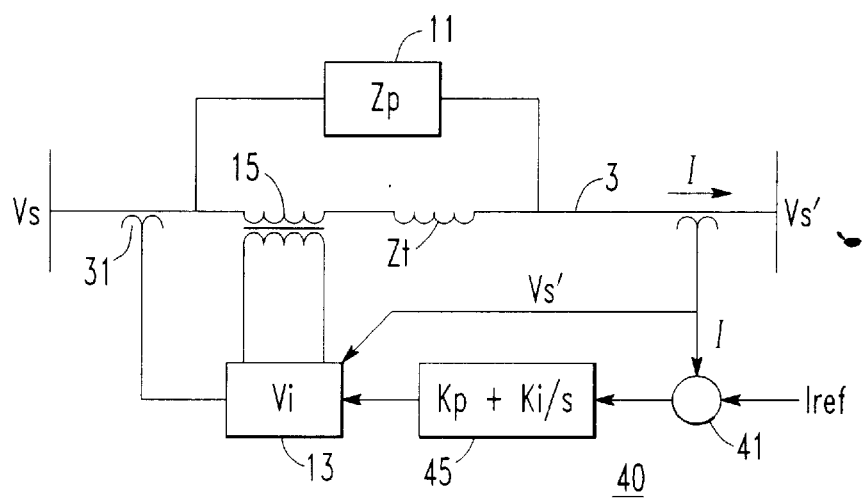
FIG. 5 is a diagram of a control scheme for an inverter-controlled series compensator in accordance with the invention.

FIG. 5 illustrates an appropriate control scheme for the ICSC of the invention in which the controller 40 uses a current set point I ref, to control the current flow through the transmission line 3 by adjusting the inverter inserted voltage $V_i$. In FIG. 5 $Z_p$ is the impedance of the reactive element which may be either inductive or capacitive. $Z_t$ the leakage reactance of the series transformer 15. The current reference, I ref is compared in the summing junction 41 with the actual current I as sensed by the sensor 43 to generate an error signal to which proportional and integral control action is applied at 45. The resultant voltage $V'_s$ is also fed back to the inverter 13 for generating the injected voltage $V_i$.

The ICSC of the invention is more flexible than the TCSC of the prior art since it provides resistive compensation if the inverter can be supplied with real power, and resistive damping if the inverter has an outlet for real power. Another advantage of the ICSC of the invention compared to the TCSC is that the ICSC applied voltage, $V_i$, is not limited by the current flow through the device, as it is in a pure variable reactance configuration. The consequence of this is that an ICSC of relatively low MVA rating can be used to replace a TCSC for damping and light-load power flow control. One additional benefit is that the inverter of the ICSC can be configured to provide more positive damping of subsynchronous resonant currents than is obtainable in the TCSC; in fact, the inverter of the ICSC can be configured to be an open circuit to subsynchronous resonant currents, thus preventing their initiation at high capacitive compensation levels.

The ICSC has some power flow capabilities similar to those of the unified power flow controller (UPFC) and the static synchronous series compensator (SSSC). The ICSC should be considered a reduced cost alternative to these devices, since the ICSC provides the same capabilities as these devices provide, but can draw upon the reactive element to provide some of the reactive power which otherwise would be supplied by the inverter through a limited range of operation. A relative disadvantage of the ICSC with respect to the UPFC or the SSSC is that the ICSC has an inherently asymmetric capability, so it is most appropriate for situations where relatively narrow control range (e.g., strictly capacitive compensation or strictly inductive compensation) is required. A significant benefit of the ICSC with respect to the UPFC and the SSSC is the contingency performance of the ICSC. If either the ICSC inverter or the parallel reactive element fails, a series compensated line is still available for the user by exercising the remaining component. On the other hand, if the SSSC inverter or the UPFC series inverter fails, all series compensation is lost.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for providing series compensation in an ac electrical power transmission system having a transmission line carrying an ac current at a selected transmission line voltage and fundamental frequency, said apparatus comprising:

a reactive impedance element connected in series in said ac transmission line;

switching power converter means generating an alternating voltage at said fundamental frequency with controllable magnitude and controllable phase angle;

means connecting said switching power converter means in parallel with said reactive impedance element to impress said alternating voltage across said reactive impedance element and thereby control flow of said current through said transmission line; and control means controlling said controllable magnitude and said controllable phase angle of said alternating voltage to control said current.

2. The apparatus of claim 1 wherein said reactive impedance element is a capacitive element.

3. The apparatus of claim 1 wherein said reactive impedance element is an inductive element.

4. The apparatus of claim 1 wherein said switching power converter means comprises an inverter provided with a source of real power.

5. The apparatus of claim 4 wherein said source of real power comprises an ac to dc converter connected in shunt to said transmission line and dc link means linking said ac to dc converter to said inverter.

6. The apparatus of claim 4 wherein said connecting means comprises conductors connecting said inverter directly in parallel with said reactive impedance element.

7. The apparatus of claim 6 wherein said reactive impedance element is a capacitive element.

8. The apparatus of claim 6 wherein said reactive impedance element is an inductive element.

9. The apparatus of claim 4 wherein said connecting means comprises an insertion transformer with a primary winding connected in parallel with said reactive impedance element and secondary winding connected to said inverter.

10. The apparatus of claim 9 wherein said reactive impedance element comprises a capacitive element.

11. The apparatus of claim 9 wherein said reactive impedance element comprises an inductive element.

12. The apparatus of claim 1 wherein said connecting means comprises conductors connecting said switching power converter means directly in parallel with said reactive impedance element.

13. The apparatus of claim 1 wherein said connecting means comprises an insertion transformer having a primary winding connected in parallel with said reactive impedance element and a secondary winding connected to said switching power converter means.

* * * * *